(12) United States Patent
Sakurai et al.

(10) Patent No.: US 11,573,658 B2
(45) Date of Patent: Feb. 7, 2023

(54) OPERATION DEVICE

(71) Applicant: TOYO DENSO KABUSHIKI KAISHA, Tokyo (JP)

(72) Inventors: Masaki Sakurai, Saitama (JP); Kazumasa Ito, Saitama (JP); Osamu Kuribara, Saitama (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/670,688

(22) Filed: Feb. 14, 2022

(65) Prior Publication Data

US 2022/0291772 A1    Sep. 15, 2022

(30) Foreign Application Priority Data

Mar. 9, 2021    (JP) ............................... JP2021-036861

(51) Int. Cl.
| | | |
|---|---|---|
| *G06F 3/041* | (2006.01) | |
| *E05F 15/665* | (2015.01) | |
| *B60J 1/17* | (2006.01) | |
| *B60R 11/02* | (2006.01) | |

(52) U.S. Cl.
CPC ............. *G06F 3/0416* (2013.01); *B60J 1/17* (2013.01); *B60R 11/0235* (2013.01); *E05F 15/665* (2015.01); *G06F 3/0412* (2013.01); *B60R 2300/20* (2013.01)

(58) Field of Classification Search
None
See application file for complete search history.

(56) References Cited

U.S. PATENT DOCUMENTS

2005/0024342 A1*  2/2005  Young ................... B60K 35/00
                                                    345/173

FOREIGN PATENT DOCUMENTS

| DE | 10 2012 216287 A1 | 5/2014 |
|---|---|---|
| JP | 2014-229014 A | 12/2014 |
| JP | 2015-017360 A | 1/2015 |
| WO | 2020/184702 A1 | 9/2020 |

OTHER PUBLICATIONS

The extended European Search Report mailed by European Patent Office dated on Jul. 11, 2022 in corresponding European patent application No. 22157953.5-1012.

* cited by examiner

*Primary Examiner* — Stephen T. Reed
(74) *Attorney, Agent, or Firm* — IP Business Solutions, LLC

(57) ABSTRACT

An operation device according to the present invention has a touch-screen-type operation surface installed in a vehicle. A plurality of operation units having a convex shape or a concave shape associated with a plurality of components mounted in the vehicle, respectively, are formed at different positions on the touch-screen-type operation surface, respectively. The plurality of operation units are configured to accept an input touch operation as an operation instruction for the component associated with each of the plurality of operation units.

11 Claims, 10 Drawing Sheets

OPERATION DEVICE

INCORPORATION BY REFERENCE

This application is based upon and claims the benefit of priority from Japanese patent application No. 2021-036861, filed on Mar. 9, 2021, the disclosure of which is incorporated herein in its entirety by reference.

TECHNICAL FIELD

The present invention relates to a touch-screen-type operation device mounted in a vehicle.

BACKGROUND ART

As an operation device to operate a component mounted in a vehicle, touch-screen-type operation devices are disclosed in Patent Documents 1 and 2. The operation device disclosed in Patent Document 1 is placed on a driver's seat door and is configured to be capable of operating the opening and closing of a driver's seat window. Specifically, the operation device disclosed in Patent Document 1 has a planar-shape touch screen and is configured to be capable of operating the opening and closing of a window by the operator's operation to shift his/her fingertip back and forth on the touch screen.

Further, the operation device disclosed in Patent Document 2 is placed on a steering and is configured to be capable of operating acoustic equipment. Specifically, the operation device disclosed in Patent Document 2 has a touch screen with a concave and a convex formed on its surface and is configured to be capable of operation such as change of volume and selection of music by the operator's shift of his/her fingertip on the touch screen so as to follow a predetermined trajectory.

Patent Document 1: Japanese Unexamined Patent Application Publication No. JP-A 2015-017360
Patent Document 2: Japanese Unexamined Patent Application Publication No. JP-A 2014-229014

However, each of the above operation devices is configured to be capable of an operation for a single component mounted in a vehicle and is incapable of an operation for a plurality of components. In particular, each of the operation devices mounted in the vehicle as described above needs an operation without looking when the driver is the operator, and such an operation without looking makes it difficult to perform a complicated touch operation for the touch screen. Therefore, it is difficult to separately operate a plurality of components with a single touch screen. As a result, there arises a problem that the operability without looking of the touch-screen-type operation device cannot be further increased.

SUMMARY OF THE INVENTION

Accordingly, an object of the present invention is to solve the abovementioned problem that the operability without looking of a touch-screen-type operation device to operate a component mounted in a vehicle cannot be further increased.

An operation device as an aspect of the present invention is an operation device having a touch-screen-type operation surface installed in a vehicle. A plurality of operation units formed in a convex shape or a concave shape associated with a plurality of components mounted in the vehicle, respectively, are formed at different positions on the touch-screen-type operation surface, respectively. The plurality of operation units are configured to accept an input touch operation as an operation instruction for the component associated with each of the operation units.

An operation acceptance method as an aspect of the present invention is an operation acceptance method by an operation device having a touch-screen-type operation surface installed in a vehicle. The operation acceptance method includes accepting a touch operation input into each of a plurality of operation units formed in a convex shape or a concave shape associated with a plurality of components mounted in the vehicle, respectively, as an operation instruction for the component associated with the operation unit. The plurality of operation units are formed at different positions on the touch-screen-type operation surface, respectively.

With the configurations as described above, the present invention can further increase the operability without looking of a touch-screen-type operation device to operate a component mounted in a vehicle.

EXAMPLE EMBODIMENT

First Example Embodiment

Figure 1:
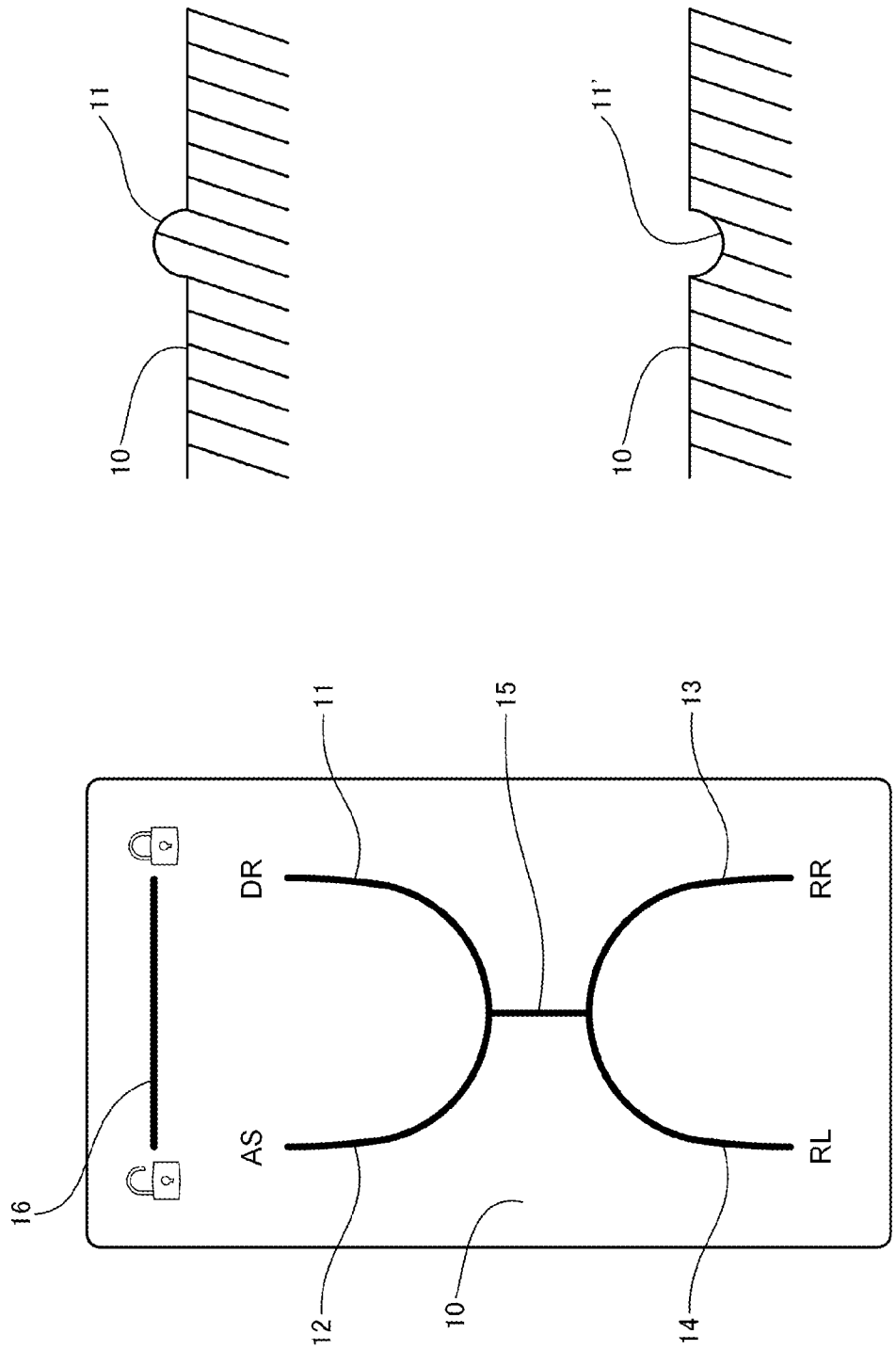
FIG. 1 is a view showing a configuration of an operation device in a first example embodiment of the present invention.
Figure 2:
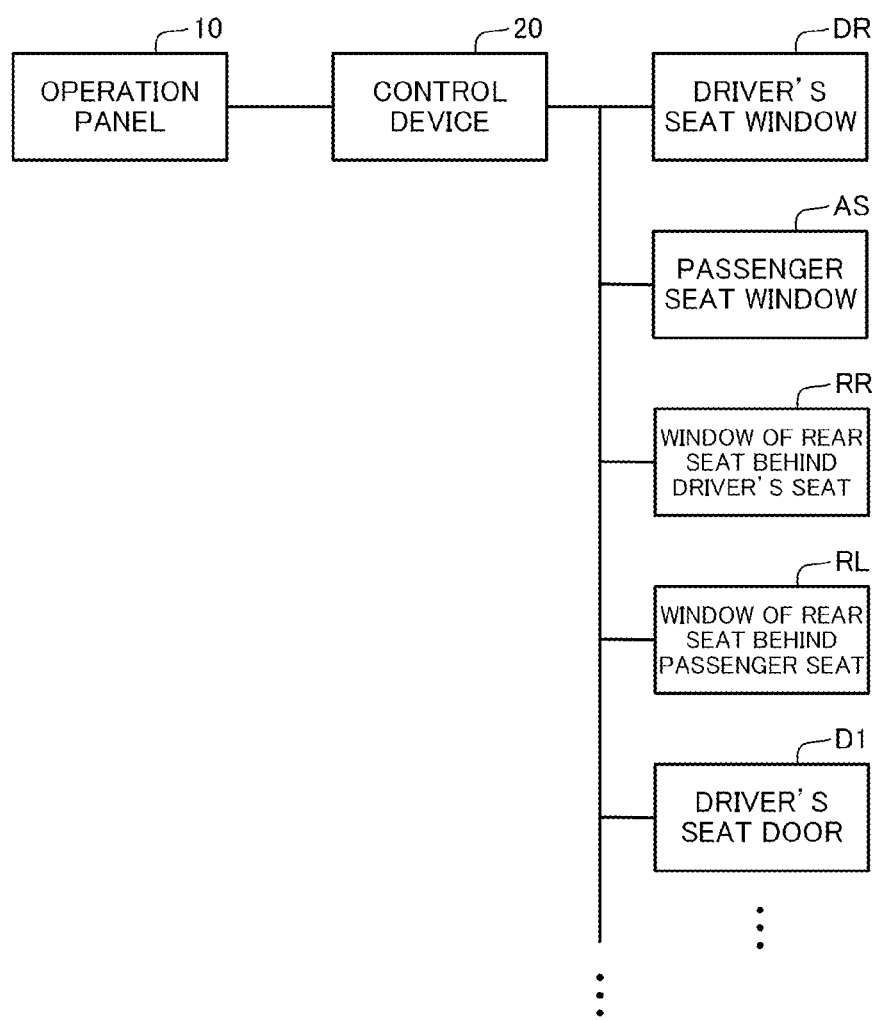
FIG. 2 is a block diagram showing an overview of a configuration for enabling a window to move including the operation device disclosed in FIG. 1.

A first example embodiment of the present invention will be described with reference to FIGS. 1 to 10. FIGS. 1 and 2 are views for describing a configuration of an operation device, and FIGS. 3 to 10 are views for describing a movement of the operation device.

Configuration

The operation device according to the present invention is majorly for operating to open and close a window of an automobile that is a vehicle, and is arranged, for example, on an armrest provided on a seat door. In particular, the operation device in this example embodiment is arranged on an armrest provided on a driver's seat door, and is configured so that an operator who is a driver can operate to open and close windows of four seats (a driver's seat, a passenger seat, a rear seat behind driver's seat, and a rear seat behind passenger seat). Moreover, the operation device is configured to be capable of, in addition to the window opening-and-closing operation, an operation to lock and unlock the window and an operation to lock and unlock the door. However, the operation device of the present invention is not necessarily limited to being provided on the driver's seat door, and may be provided on another seat door or at any place in the vehicle, not limited to the door. Moreover, the operation device of the present invention is not necessarily limited to the operation to open and close the four windows, and may be configured to be capable of an operation to open and close two or more windows. Furthermore, the operation device of the present invention is not limited to the operation of the window, and may be used for operating any component of the vehicle. That is to say, the operation device according to the present invention may accept an operation for the operation device as will be described later as an operation instruction for a component other than the window and control the component in accordance with the operation instruction.

A left view of FIG. 1 is a view of part of the operation device in this example embodiment as seen from above. In this view, the upward direction indicates the front side of the vehicle, the downward direction indicates the rear side of the vehicle, and the widthwise direction indicates the width direction of the vehicle. Therefore, a driver's seat window is located on the right side of the operation device, a passenger seat window is located on the left side, a window of rear seat behind driver's seat is located on the right rear side, and a window of rear seat behind passenger seat is located on the left rear side.

As shown in the left view of FIG. 1, the operation device includes an operation panel 10 having a substantially rectangular shape. The operation panel 10 has, for example, a capacitive touch-screen-type operation surface, and is configured to detect a position on the operation surface touched in a touch operation with the operator's finger. However, the operation panel 10 is not limited to the capacitive type, and may have any configuration as long as it can detect a touch operation for the operation surface with an operation object such as a finger.

Specifically, the surface of the operation panel 10 is formed in a planar shape as a whole, and convex operation units 11 to 16 are formed on part thereof. For example, an upper right view of FIG. 1 is a cross-sectional view of a site where the operation unit 11 is formed on part of the operation panel 10, and the operation units 11 to 16 each have a shape protruding from the surface of the operation panel 10 in a substantially semi-arc shape. As shown in the left view of FIG. 1, the operation units 11 to 16 are each formed in a linear shape in which the convex site has a predetermined length, and are formed into a plurality of operation units, respectively, as shown below. The operation units 11 to 16 are not necessarily limited to being formed by convex sites, and may be formed by a concave site 11' as shown in a lower right view of FIG. 1. Moreover, the operation units 11 to 16 are not necessarily limited to being formed in a linear shape, and may be formed by a convex site or a concave site having a predetermined width.

Specifically, the operation units 11 to 16 are firstly separated into window operation units denoted by reference numerals 11 to 15 formed in the middle of the operation panel 10 and a door lock operation unit denoted by reference numeral 16 formed in the front of the operation panel 10. Then, among the window operation units 11 to 15, a site located in the right front of the vehicle and extending forward forms a driver's seat window operation unit 11 (a first operation unit), and a site located in the left front of the vehicle and extending forward forms a passenger seat window operation unit 12 (a second operation unit). The driver's seat window operation unit 11 and the passenger seat window operation unit 12 have rear ends extended and connected to each other and are formed in a substantially U-letter shape that opens to the front of the vehicle. Moreover, among the window operation units 11 to 15, a site located in the right rear of the vehicle and extending backward forms an operation unit 13 for window of rear seat behind driver's seat (a third operation unit), and a site located in the left rear of the vehicle and extending backward forms an operation unit 14 for window of rear seat behind passenger seat (a fourth operation unit). The operation unit 13 for window of rear seat behind driver's seat and the operation unit 14 for window of rear seat behind passenger seat have front ends extended and connected to each other and are formed in a substantially inversed U-letter shape that opens to the rear of the vehicle. Moreover, the connection part of the driver's seat window operation unit 11 and the passenger seat window operation unit 12 located in the front of the vehicle and the connection part of the operation unit 13 for window of rear seat behind driver's seat and the operation unit 14 for window of rear seat behind passenger seat located in the rear of the vehicle are connected by a connection unit 15 (a guide unit) having a substantially linear shape extending in the fore-and-aft direction of the vehicle. That is to say, the window operation units 11 to 15 are formed in a shape branching and extending from the connection unit 15 in directions corresponding to the positions of the respective seats with the connection unit 15 as the center. Moreover, the door lock operation unit 16 is formed in a substantially linear shape extending in the width direction of the vehicle.

As described above, the operation units 11 to 16 are formed in different positions, respectively, on the surface of the operation panel 10, and different components are associated with the operation units 11 to 16, respectively. In particular, the operation units denoted by reference numerals 11 to 14 are associated with the windows, respectively, and relative formation positions of the operation units 11 to 14 on the surface of the operation panel 10 correspond to a relative positional relation of the windows associated therewith. For example, a driver's seat window DR located in the right front of the vehicle is associated with the driver's seat window operation unit 11 located in the right front of the operation panel 10, and a passenger seat window AS located in the left front of the vehicle is associated with the passenger seat window operation unit 12 located in the left front of the operation panel 10. Moreover, a window RR of rear seat behind driver's seat located in the right rear of the vehicle is associated with the operation unit 13 for window of rear seat behind driver's seat located in the right rear of the operation panel 10, and a window RL of rear seat behind passenger seat located in the left rear of the vehicle is associated with the operation unit 14 for window of rear seat behind passenger seat located in the left rear of the operation panel 10. All the doors including a driver's seat door D1 are associated with the door lock operation unit 16.

In this example embodiment, a case where the operation device is applied to a right-hand drive vehicle in which the driver's seat is located on the right side of the vehicle is illustrated. In a case where the operation device is applied to a left-hand drive vehicle in which the driver's seat is located on the left side of the vehicle, the names of the operation units 11 to 14 and windows corresponding thereto are different. That is to say, when the operation device is applied to a left-hand drive vehicle, the operation unit 11 located in the right front of the operation panel 10 corresponds to the passenger seat window operation unit and is associated with the passenger seat window located in the right front of the vehicle, and the operation unit 12 located in the left front of the operation panel 10 corresponds to the driver's seat window operation unit and is associated with the driver's seat window located in the left front of the vehicle. Moreover, the operation unit 13 located in the right rear of the operation panel 10 corresponds to the operation unit for window of rear seat behind passenger seat and is associated with the window of rear seat behind passenger seat located in the right rear of the vehicle, and the operation unit 14 located in the left rear of the operation panel 10 corresponds to the operation unit for window of rear seat behind driver's seat and is associated with the window of rear seat behind driver's seat located in the left rear of the vehicle.

Then, the operation panel 10 accepts touch operations input by the operator as different operation instructions, respectively, in accordance with touched positions and the contents of the touch operations. That is to say, the operation panel 10 detects whether a touch operation is for any of the operation units 11 to 16 or for a part other the operation units 11 to 16, and accepts the touch operation as an operation instruction according to any of the operation units 11 to 16 that is an operation target and the content of the operation. The operation panel 10 is equipped with a detecting unit (now shown), and the detecting unit accepts an operation instruction according to the position and content of a touch operation on the operation panel 10. Then, the operation panel 10 notifies a control device 20 mounted in the vehicle of the accepted operation instruction, and the control device 20 controls the movement of a window or a door in accordance with the accepted operation instruction. Here, the outline of a configuration provided in the vehicle to control the movement of a window or a door by a touch operation input into the operation panel 10 is shown in a block diagram of FIG. 2. The control device 20 may function as the operation device in conjunction with the operation panel 10 and function so as to detect the position and content of a touch operation input into the operation panel 10 and accept an operation instruction according to the touch operation.

Figure 3:
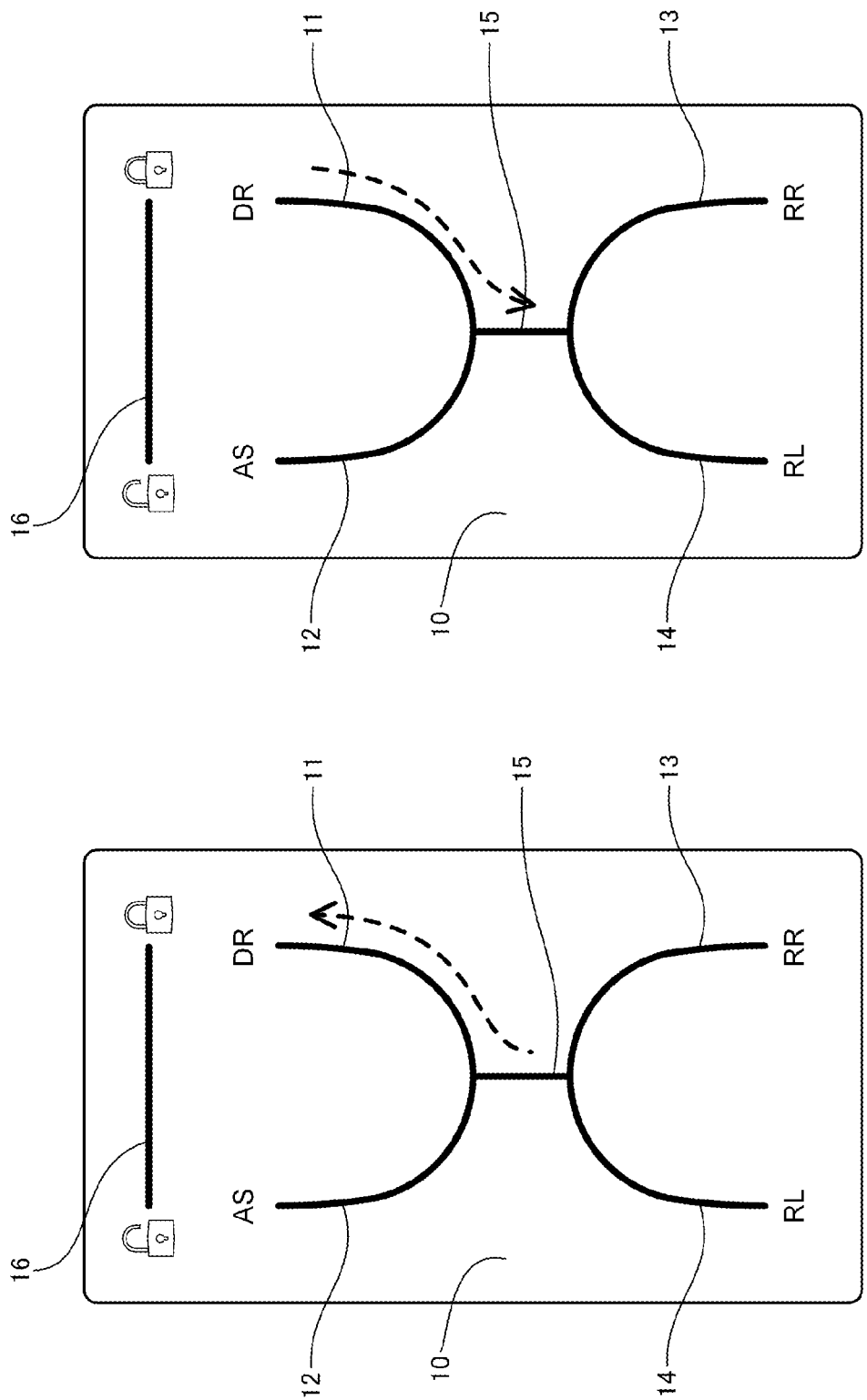
FIG. 3 is a view showing an image of an operation of the operation device disclosed in FIG. 1.
Figure 4:
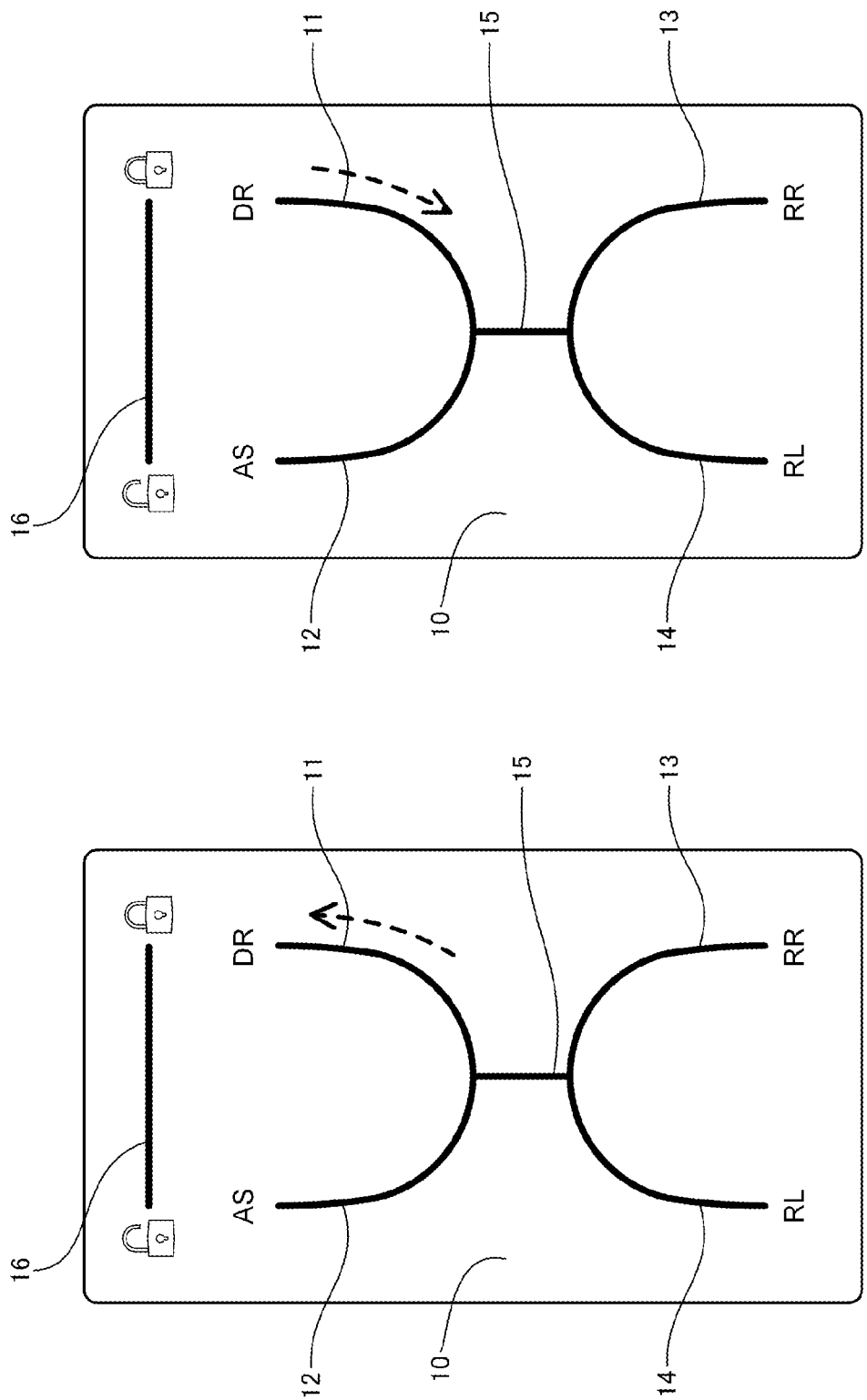
FIG. 4 is a view showing an image of an operation of the operation device disclosed in FIG. 1.

Specifically, with reference to FIGS. 3 to 8, an example of a touch operation input into the operation panel 10 and an operation instruction accepted at the time will be described. First, FIGS. 3 and 4 show an image when the driver's seat window operation unit 11 formed in the right front on the surface of the operation panel 10 is operated. In FIGS. 3 and 4, the convex operation unit itself is operated as indicated by dotted-line arrow. In a case where the operator performs a touch operation of shifting his/her finger from on the connection unit 15 to the vicinity of the front end of the driver's seat window operation unit 11 as indicated by dotted-line arrow in a left view of FIG. 3 or from the vicinity of the front end of the driver's seat window operation unit 11 to on the connection unit 15 as indicated by dotted-line arrow in a right view of FIG. 3, the operation panel 10 detects the touch operation as an operation of the driver's seat window operation unit 11 and accepts the operation as an operation instruction to open or close the driver's seat window DR associated with the driver's seat window operation unit 11. For example, in a case where the touch operation is performed in a substantially frontward direction of the vehicle along the longitudinal direction of the driver's seat window operation panel 11 as shown in the left view of FIG. 3, the operation panel 10 accepts as an operation instruction to close the driver's seat window DR. On the other hand, in a case where the touch operation is performed in a substantially rearward direction of the vehicle along the longitudinal direction of the driver's seat window operation unit 11 as shown in the right view of FIG. 3, the operation panel 10 accepts as an operation instruction to open the driver's seat window DR.

At this time, furthermore, the operation panel 10 may accept as different operation instructions in accordance with the operation contents of touch operations of shifting a finger along the longitudinal direction of the driver's seat operation unit 11. That is to say, the operation panel 10 may separately detect the contents of operations in which the speeds, times, amounts or the like of the operations by finger are different, and accept the respective operations as different operation instructions. For example, in a case where a so-called swipe operation of slowly shifting a finger is performed on the driver's seat window operation unit 11, the operation panel 10 accepts as an operation instruction to open or close the driver's seat window DR only while the finger is touching the driver's seat window operation unit 11. At this time, the operation panel 10 may accept as an operation instruction with a different speed of opening or closing the driver's seat window DR in accordance with the amount of shifting a finger, that is, a swipe operation amount. For example, the operation panel 10 accepts as an operation instruction to open or close the driver's seat window DR at a preset reference speed in a case where the swipe operation amount is equal to or less than a threshold value, and the operation panel 10 accepts as an operation instruction to open or close the driver's seat window DR at a preset speed higher than the reference speed in a case where the swipe operation amount is more than the threshold value. On the other hand, in a case where a so-called flick operation of quickly shifting a finger is performed on the driver's seat window operation unit 11, the operation panel 10 accepts as an operation instruction to automatically open or close the driver's seat window DR until completely opening or closing. In a case where a touch operation is performed on the driver's seat window operation unit 11 after the abovementioned flick operation is performed on the driver's seat window operation unit 11, the operation panel 10 accepts as an operation instruction to stop the automatic opening or closing of the driver's seat window DR.

A touch operation for the driver's seat window operation unit 11 accepted by the operation panel 10 as described above does not need to necessarily include a touch operation for the connection unit 15 as shown in the left and right views of FIG. 3. That is to say, instead of the touch operation from on the connection unit 15 to the vicinity of the front end of the driver's seat window operation unit 11 or the touch operation from the vicinity of the front end of the driver's seat window operation unit 11 to on the connection unit 15, the operation panel 10 may accept a swipe operation or a flick operation by the operator shifting his/her finger on the driver's seat window operation unit 11 as indicated by dotted arrow in left and right views of FIG. 4 as an operation to open and close the driver's seat window DR in the same manner as described above. However, by including the connection unit 15 in the touch operation on the driver's seat window operation unit 11, the operator can recognize the position of each of the operation units 11, 12, 13 and 14 with the connection unit 15 as the starting point, and an operation without looking is more facilitated.

Although a case of accepting a flick operation as an operation instruction to automatically open or close a window until completely opening or closing is illustrated above, a swipe operation may be accepted as an operation instruction to automatically open or close a window. In such a case, a flick operation may be accepted as a so-called manual opening-and-closing operation instruction to open or close a window in accordance with the amount of shifting a finger.

Then, the operation panel 10 accepts, as with the touch operation for the driver's seat window operation unit 11 described above, touch operations for the other operation units 12, 13 and 14 as opening-and-closing operations for the windows associated with the operation units 12, 13 and 14, respectively. That is to say, the operation unit 10 accepts a touch operation for the passenger seat window operation unit 12 as an operation instruction to open or close the passenger seat window AS, accepts a touch operation for the operation unit 13 for window of rear seat behind driver's seat as an operation instruction to open or close the window RR of rear seat behind driver's seat, and accepts a touch operation for the operation unit 14 for window of rear seat behind passenger seat as an operation instruction to open or close the window RL of rear seat behind passenger seat.

Figure 5:
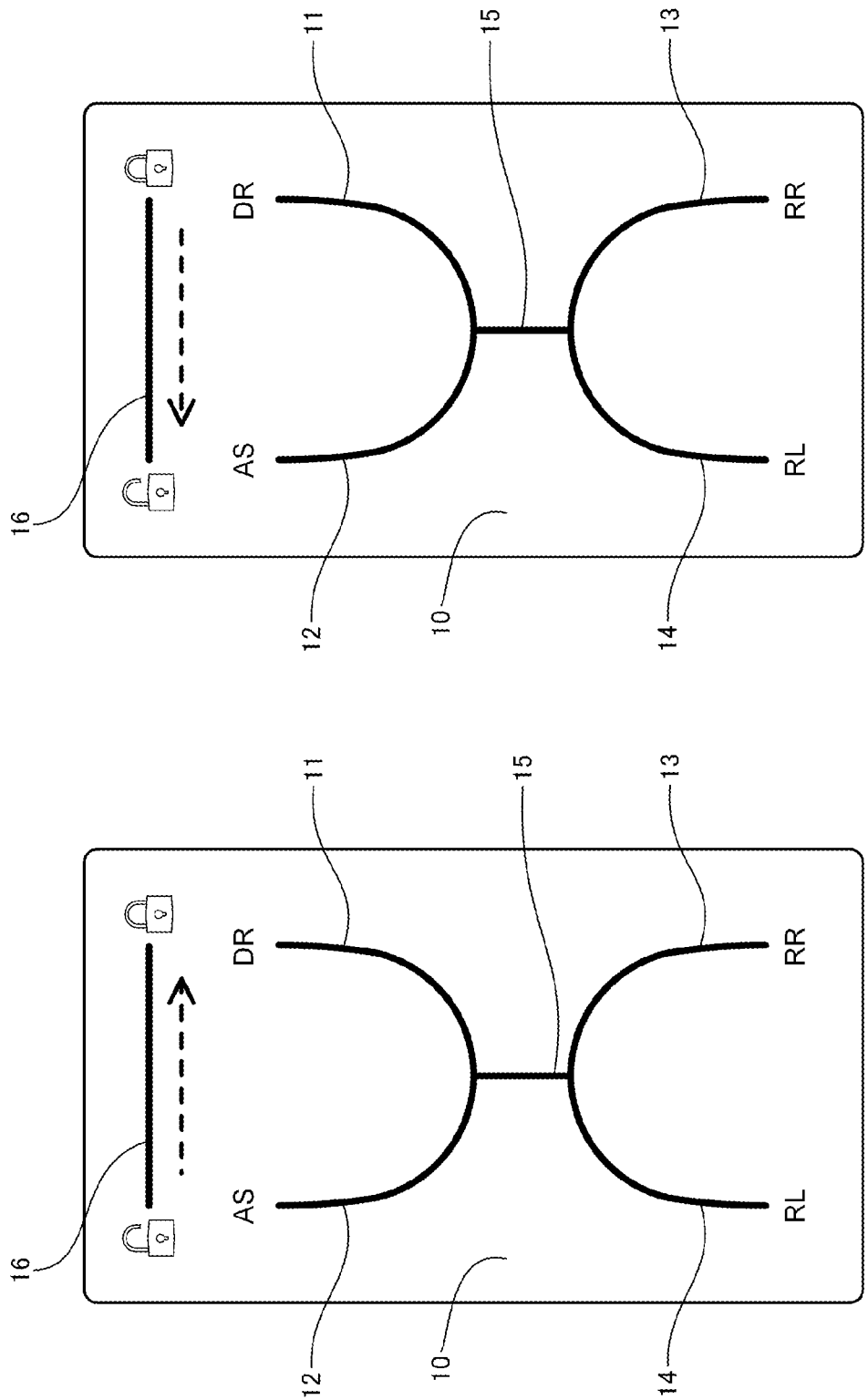
FIG. 5 is a view showing an image of an operation of the operation device disclosed in FIG. 1.

Next, FIG. 5 shows an image when the door lock operation unit 16 formed in the front on the surface of the operation panel 10 is operated. When the operator performs a touch operation of shifting his/her finger along the shape of the door lock operation unit 16 linearly formed as indicated by dotted arrow in left and right views of FIG. 5, the operation panel 10 detects as an operation for the door lock operation unit 16 and accepts as an operation instruction to lock or unlock all the doors associated with the door lock operation unit 16. For example, when a swipe operation is performed toward a lock figure, that is, rightward along the length direction of the door lock operation unit 16 as shown in the left view of FIG. 5, the operation panel 10 accepts as an operation instruction to lock all the doors. On the other hand, when a swipe operation is performed toward an unlock figure, that is, leftward along the length direction of the door lock operation unit 16 as shown in the right view of FIG. 5, the operation panel 10 accepts as an operation instruction to unlock all the doors.

Figure 6:
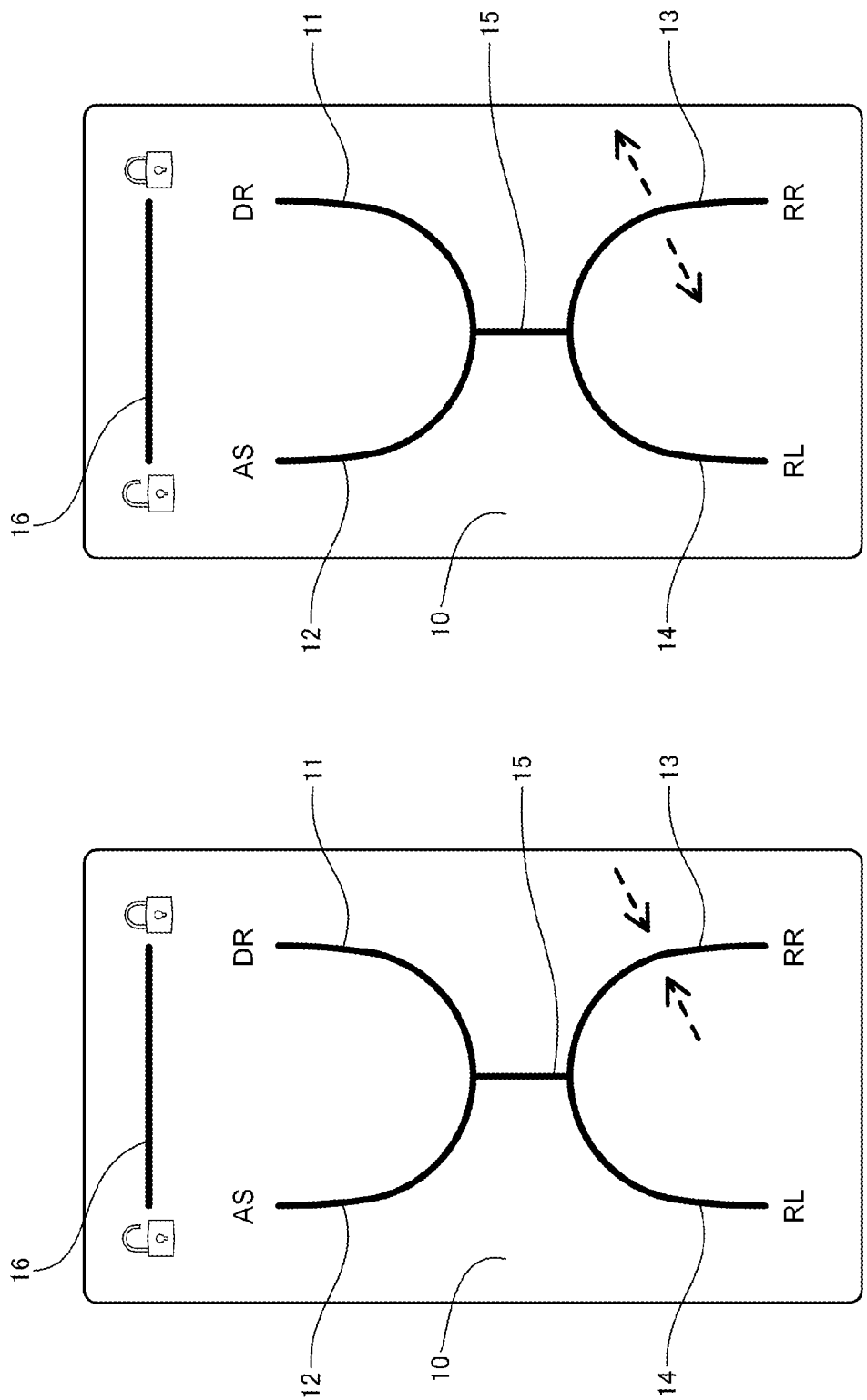
FIG. 6 is a view showing an image of an operation of the operation device disclosed in FIG. 1.
Figure 7:
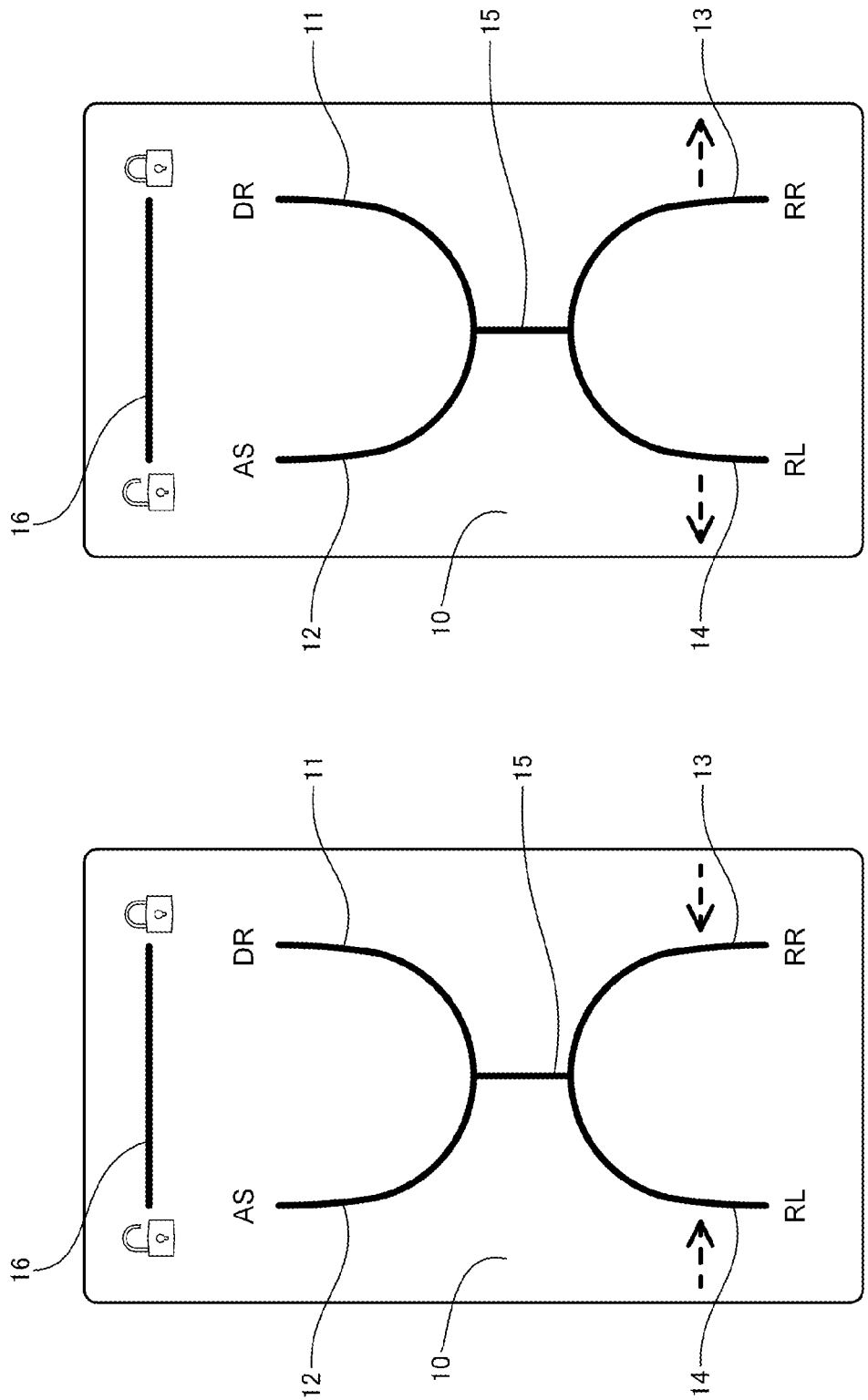
FIG. 7 is a view showing an image of an operation of the operation device disclosed in FIG. 1.
Figure 8:
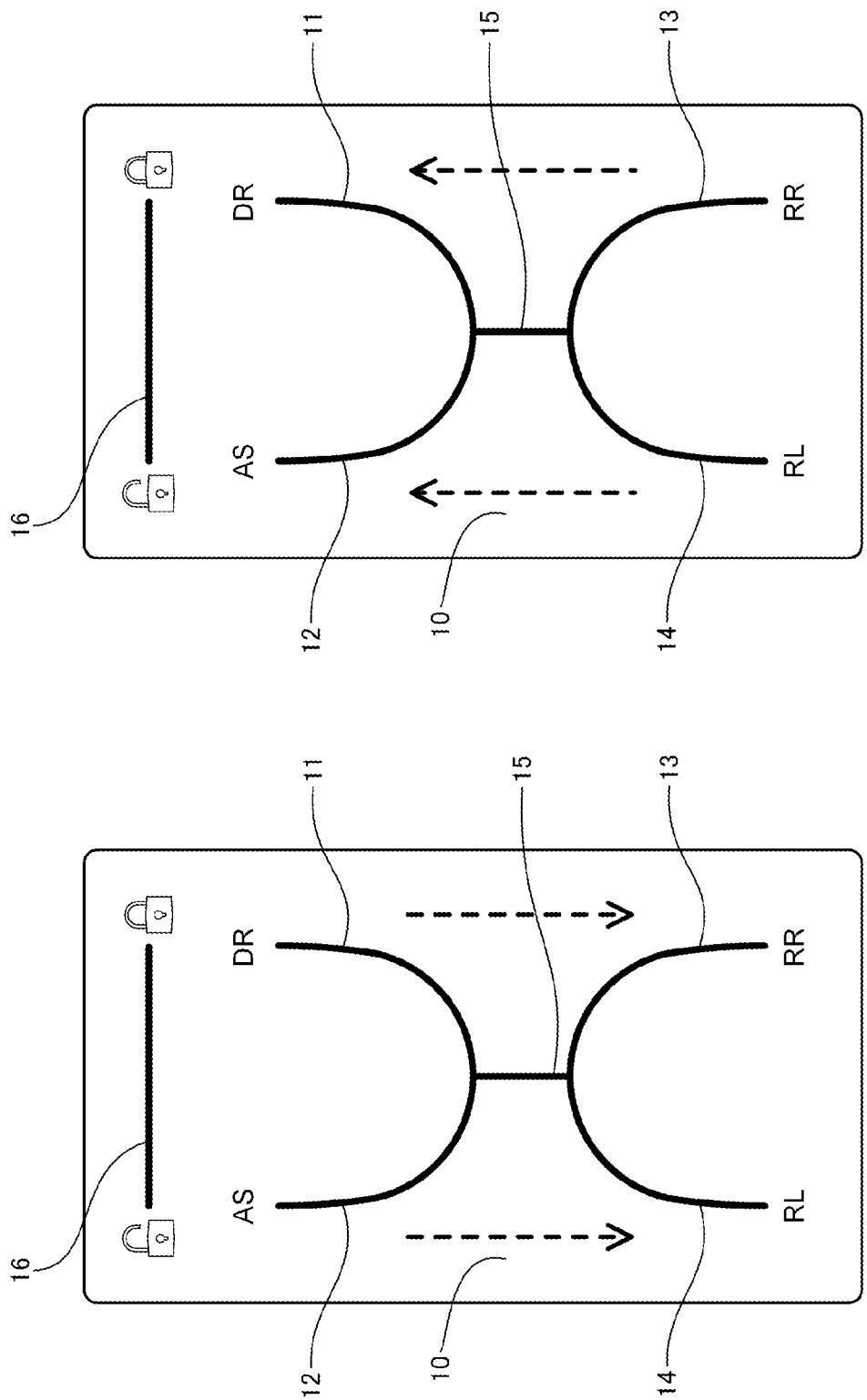
FIG. 8 is a view showing an image of an operation of the operation device disclosed in FIG. 1.

Next, FIGS. 6 to 8 show images when a touch operation is performed on a part other than the abovementioned convex operation units 11 to 16 on the surface of the operation panel 10. In particular, FIG. 6 shows an image when the operator performs a pinch-in operation of bringing his/her two fingers closer to each other so as to pinch and a pinch-out operation of making his/her two fingers away from each other so as to spread. When the operator performs a pinching in this manner, the operation panel 10 specifies any of the operation units 11 to 14 located and formed near an operation part in the pinch operation, in this case, any of the operation units 11 to 14 located between the fingers by the pinch operation, and accepts as an operation instruction to control the density of the color of the window associated with the specified one of the operation units 11 to 14. For example, when a pinch-in operation is performed for the operation unit 13 for window of rear seat behind driver's seat as indicated by dotted arrow in a left view of FIG. 6, the operation panel 10 accepts as an operation instruction to increase the density of the color of the window RR of rear seat behind driver's seat. On the other hand, when a pinch-out operation is performed for the operation unit 13 for window of rear seat behind driver's seat as indicated by dotted arrow in a right view of FIG. 6, the operation panel 10 accepts as an operation instruction to decrease the density of the color of the window RR of rear seat behind driver's seat.

FIG. 7 shows an image when the operator performs a pinch operation with his/her two fingers across a plurality of operation units 11 to 14. In this case, the operation panel 10 specifies a plurality of operation units 11 to 14 located between the fingers by the pinch operation, and accepts as an operation instruction to collectively control the densities of the colors of a plurality of windows associated with the specified ones of operation units 11 to 14. For example, when the operator performs a pinch-in operation across the operation unit 13 for window of rear seat behind driver's seat and the operation unit 14 for window of rear seat behind passenger seat as indicated by dotted arrow in a left view of FIG. 7, the operation panel 10 accepts as an operation instruction to collectively increase the densities of the colors of the window RR of rear seat behind driver's seat and the window RL of rear seat behind passenger seat. On the other hand, when the operator performs a pinch-out operation across the operation unit 13 for window of rear seat behind driver's seat and the operation unit 14 for window of rear seat behind passenger seat as indicated by dotted arrow in a right view of FIG. 7, the operation panel 10 accepts as an operation instruction to collectively decrease the densities of the colors of the window RR of rear seat behind driver's seat and the window RL of rear seat behind passenger seat.

Next, FIG. 8 shows an image when the operator simultaneously shifts his/her two fingers in the same direction, that is, performs a so-called two-finger swipe operation on a part other than the abovementioned convex operation units 11 to 16 on the surface of the operation panel 10. When the operator thus performs a two-finger swipe operation, the operation panel 10 accepts as an operation instruction to lock or unlock all the windows. For example, when the operator performs a two-finger swipe operation from the front to the rear in the regions on the left and right sides of the operation panel 10 where the convex operation units 11 to 16 are not formed as shown in a left view of FIG. 8, the operation panel 10 accepts as an operation instruction to unlock all the windows. On the other hand, when the operator performs a two-finger swipe operation from the rear to the front in the regions on the left and right sides of the operation panel 10 where the convex operation units 11 to 16 are not formed as shown in a right view of FIG. 8, the operation panel 10 accepts as an operation instruction to lock all the windows.

The control device 20 may control to notify the operator of information representing the content of the operation instruction accepted by the operation panel 10 as described above. In particular, it is easy for the operator to, in the case of the convex operation units 11 to 16 of the operation panel 10, recognize without looking the target and content of an operation based on the shape thereof. However, it may be hard to recognize the content of an operation in the case of a part other than the convex operation units 11 to 16 on the surface of the operation panel 10 as described with reference to FIGS. 6 to 8. Therefore, in a case where an operation instruction by a touch operation on a part other than the convex operation units 11 to 16 on the surface of the operation panel 10 is accepted as described with reference to FIGS. 6 to 8, the control device 20 controls to notify a fact that the operation instruction is accepted through a notifying unit installed in the vehicle. For example, the notifying unit is formed of an indicator provided at a predetermined position in the vehicle, a lamp in the instrument panel, and a lamp provided in the operation panel 10. Then, the notifying unit may turn on, for example, and thereby notify the operator of the density state or the lock state of each window controlled by acceptance of a pinch operation or a two-finger swipe operation as shown in FIGS. 6 to 8. Moreover, the notifying unit may notify by outputting a sound.

Although a case where the operation units 11 to 16 are formed in a convex shape or a concave shape is described above, the operation units 11 to 16 may be formed by a combination of a convex site and a concave site. For example, the window operation units 11 to 15 may be formed in a convex shape, and the door lock operation unit 16 may be formed in a concave shape. Furthermore, the window operation units 11 to 15 may be formed by a combination of a convex site and a concave site in accordance with the arrangement thereof; for example, those in the front of the vehicle are formed in a convex shape and those in the rear of the vehicle are formed in a concave shape, or those on the left side of the vehicle are formed in a convex shape and those on the right side of the vehicle are formed in a concave shape. With this, the operator can more easily recognize the operation units 11 to 16 being operated by the feel due to the difference of the concave and convex shapes, and the operability of an operation without looking can be increased.

Movement

Figure 9:
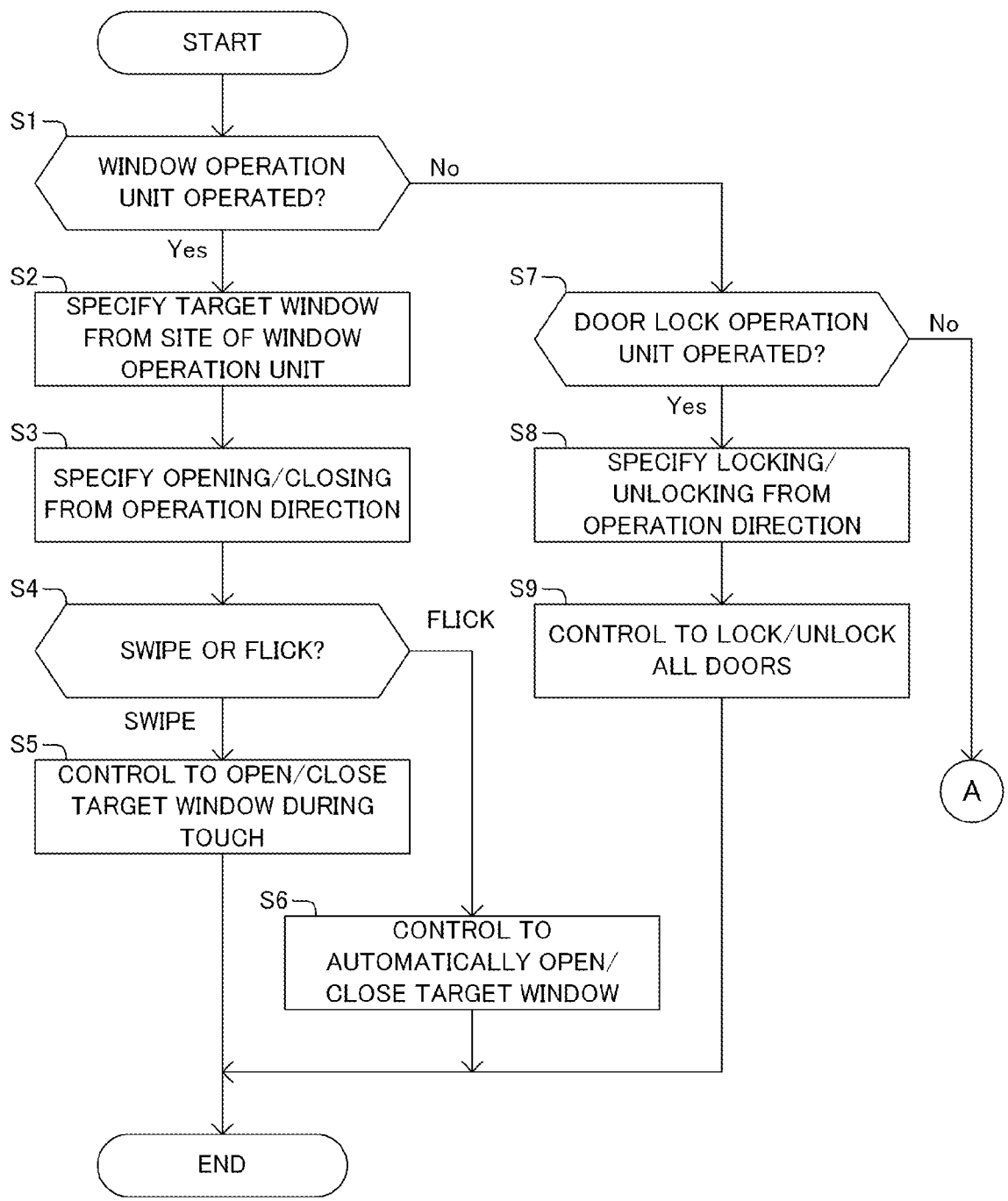
FIG. 9 is a flowchart showing an operation method of the operation device disclosed in FIG. 1.
Figure 10:
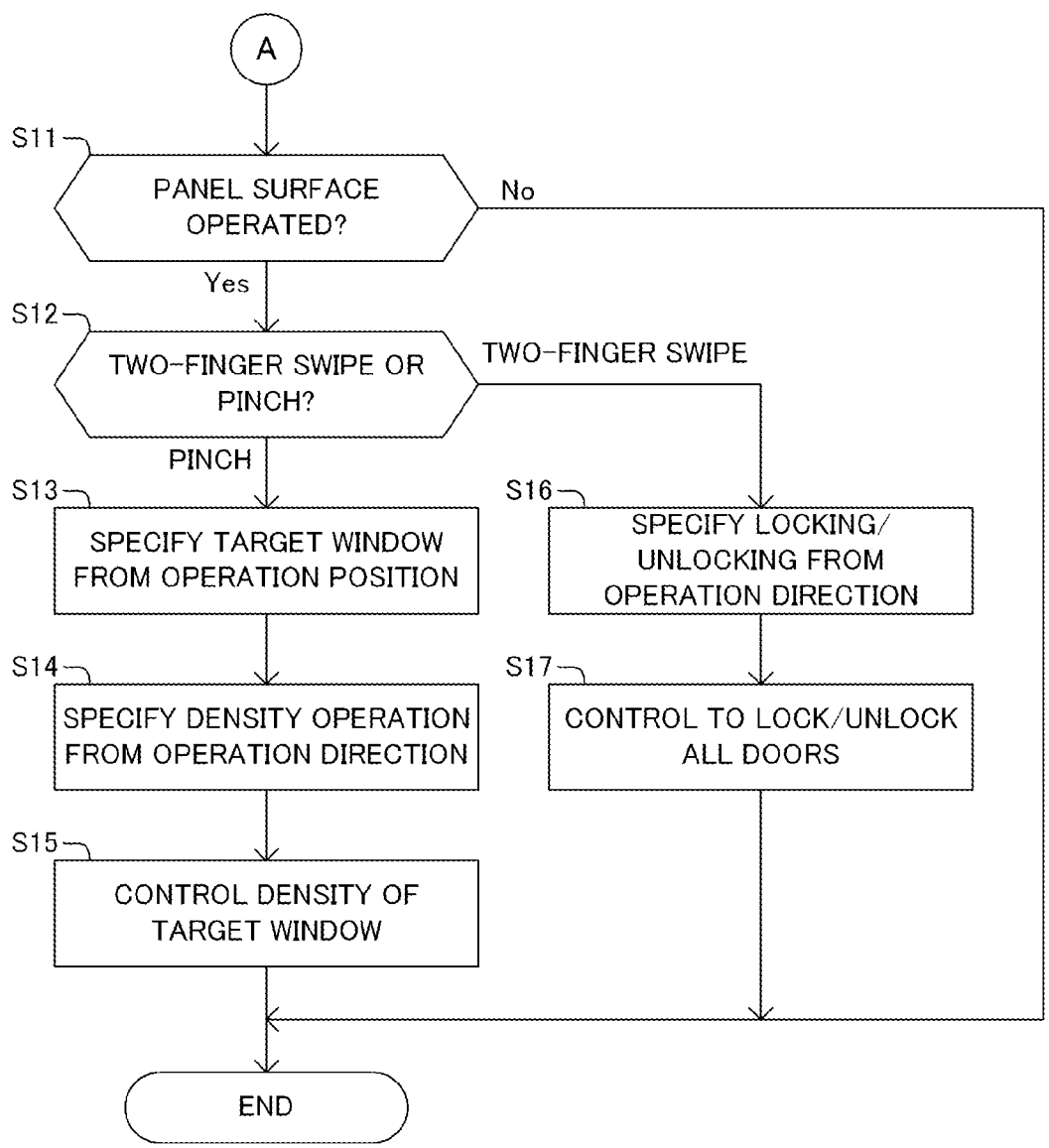
FIG. 10 is a flowchart showing an operation method of the operation device disclosed in
FIG. 1.

Next, a movement of the operation device when the operation panel 10 described above is operated will be described majorly with reference to the flowcharts of FIGS. 9 and 10. First, a case where the convex operation units 11 to 16 of the operation panel 10 are operated will be described majorly with reference to the flowchart of FIG. 9.

When detecting a touch operation by the operator on the operation panel 10 and detecting that any of the window operation units 11 to 15 is operated (Yes at step S1), the operation device detects an operated site among the window operation units 11 to 15 and specifies a target window that is an operation target corresponding to the operated site (step S2). Then, the operation device detects the content of the operation for the operated site, for example, an operation direction and an operation speed (steps S3 and S4), and controls the opening and closing of the target window in accordance with the content of the operation (step S5 or S6).

As an example, when a swipe operation is performed from on the connection unit 15 to the vicinity of the front end of the driver's seat window operation unit 11 among the window operation units 11 to 15 as indicated by dotted arrow in the left view of FIG. 3 (step S3 and swipe at step S4), the operation device drives and controls to close the driver's seat window DR only during the touch (step S5). On the other hand, when a flick operation is performed from on the connection unit 15 to the vicinity of the front end of the driver's seat window operation unit 11 among the window operation units 11 to 15 as indicated by dotted arrow in the left view of FIG. 3 (step S3 and flick at step S4), the operation device drives and controls to automatically close the driver's seat window DR until completely closing (step S6). Moreover, when a swipe operation is performed from the vicinity of the front end of the driver's seat window operation unit 11 among the window operation units 11 to 15 to on the connection unit 15 as indicated by dotted arrow in the right view of FIG. 3 (step S3 and swipe at step S4), the operation device drives and controls to open the driver's seat window DR only during the touch (step S5). On the other hand, when a flick operation is performed from the vicinity of the front end of the driver's seat window operation unit 11 among the window operation units 11 to 15 to on the connection unit 15 as indicated by dotted arrow in the right view of FIG. 3 (step S3 and flick at step S4), the operation device drives and controls to automatically open the driver's seat window DR until completely opening (step S6).

Further, the operation device controls the opening and closing of the other windows in accordance with an operation for the other window operation units 12 to 15 in the same manner as described above. For example, the operation device drives and controls to open and close the passenger seat window AS in accordance with a swipe or flick operation for the passenger seat window operation unit 12. Moreover, the operation device drives and controls to open and close the window RR of rear seat behind driver's seat in accordance with a swipe or flick operation for the operation unit 13 for window of rear seat behind driver's seat. Moreover, the operation device drives and controls to open and close the window RL of rear seat behind passenger seat in accordance with a swipe or flick operation for the operation unit 14 for window of rear seat behind passenger seat.

Further, when detecting a touch operation by the operator on the operation panel 10 and detecting that the door operation unit 16 is operated (No at step S1 and Yes at Step 7), the operation device detects the direction of the operation for the door operation unit 16 (step S8) and controls the locking and unlocking of the door in accordance with the direction of the operation (step S9). As an example, when the door lock operation unit 16 is swiped toward the lock figure, that is, rightward as indicated by dotted arrow in the left view of FIG. 5, the operation device controls to lock all the doors. On the other hand, when the door lock operation unit 16 is swiped toward the unlock figure, that is, leftward as indicated by dotted arrow in the right view of FIG. 5, the operation device controls to unlock all the doors.

Next, a case where a part other than the convex operation units 11 to 16 of the operation panel 10 is operated will be described majorly with reference to the flowchart of FIG. 10. When detecting a touch operation by the operator on the operation panel 10 and detecting that a panel surface other than the convex operation units 11 to 16 is operated (Yes at step S11), the operation device detects the content of the operation (step S12). For example, when detecting a pinch operation on the panel surface (pinch at step S12), the operation device specifies a target window to be an operation target based on the operation position (step S13). Then, the operation device detects an operation direction of the pinch operation at the operation position (step S14), and controls the density of the target window in accordance with the operation direction (step S15). As an example, when a pinch-in operation is performed across the operation unit 13 for window of rear seat behind the driver's seat as indicated by dotted arrow in the left view of FIG. 6, the operation device controls to increase the density of the color of the window RR of rear seat behind driver's seat. On the other hand, when a pinch-out operation is performed on the operation unit 13 for window of rear seat behind the driver's seat as indicated by dotted arrow in the right view of FIG. 6, the operation device controls to decrease the density of the color of the window RR of rear seat behind driver's seat.

Further, when detecting a two-finger swipe operation on the panel surface (two-finger swipe at step S12), the operation device detects an operation position and an operation direction of the two-finger swipe operation (step S16), and controls the locking and unlocking of the windows in accordance with the operation direction (step S17). As an example, when a two-finger swipe is performed from the front side to the rear side in the regions on the left and right sides of the convex operation units 11 to 15 as indicated by dotted line arrow in the left view of FIG. 8, the operation device controls to unlock all the windows. On the other hand, when a two-finger swipe operation is performed from the rear side to the front side in the regions on the left and right sides of the convex operation units 11 to 15 as indicated by dotted line arrow in the right view of FIG. 8, the operation device controls to lock all the windows except the driver's seat window.

As described above, the operation device according to the present invention is capable of separate operation of a plurality of components of a vehicle such as a plurality of windows on the single operation panel 10. As a result, it is possible to further increase the operability of an operation without looking in a touch-screen-type operation device.

Supplementary Notes

The whole or part of the example embodiments disclosed above can be described as the following supplementary notes. An overview of an operation device according to the present invention will be described below. However, the present invention is not limited to the following configurations.

Supplementary Note 1

An operation device having a touch-screen-type operation surface installed in a vehicle, wherein:
a plurality of operation units formed in a convex shape or a concave shape associated with a plurality of components mounted in the vehicle, respectively, are formed at different positions on the touch-screen-type operation surface, respectively; and
the plurality of operation units are configured to accept an input touch operation as an operation instruction for the component associated with each of the operation units.

Supplementary Note 2

The operation device according to Supplementary Note 1, wherein
at each of positions on the touch-screen-type operation surface corresponding to a relative positional relation of the plurality of components mounted in the vehicle, the operation unit associated with each of the components is formed.

Supplementary Note 3

The operation device according to Supplementary Note 2, wherein
some or all of the plurality of operation units are formed to be connected to each other on the touch-screen-type operation surface.

Supplementary Note 4

The operation device according to Supplementary Note 2 or 3, wherein:
at each of positions on the touch-screen-type operation surface corresponding to a relative positional relation of a plurality of windows mounted in the vehicle, the operation unit associated with each of the windows is formed; and
the plurality of operation units are configured to accept an input touch operation as an operation instruction for the window associated with each of the operation units.

Supplementary Note 5

The operation device according to Supplementary Note 4, wherein
the operation unit is formed in a linear shape having a predetermined length and is configured to accept a touch operation input along the linear shape as an operation instruction to open or close the associated window.

Supplementary Note 6

The operation device according to Supplementary Note 5, wherein
the operation unit is formed in a linear shape extending substantially toward a front and a rear of the vehicle and is configured to accept a touch operation input substantially toward the front as an operation to close the associated window and accept a touch operation input substantially toward the rear as an operation to open the associated window.

Supplementary Note 7

The operation device according to Supplementary Note 5 or 6, wherein
the operation unit is configured to accept the touch operation input along the linear shape as a different operation instruction for the associated window in accordance with an operation content of the touch operation.

Supplementary Note 8

The operation device according to any of Supplementary Notes 5 to 7, wherein
the plurality of operation units include:
a first operation unit associated with the window in a right front of the vehicle and formed in a right front of the touch-screen-type operation surface;
a second operation unit associated with the window in a left front of the vehicle and formed in a left front of the touch-screen-type operation surface;
a third operation unit associated with the window in a right rear of the vehicle and formed in a right rear of the touch-screen-type operation surface; and
a fourth operation unit associated with the window in a left rear of the vehicle and formed in a left rear of the touch-screen-type operation surface, and wherein:
the first operation unit and the second operation unit are formed to be connected to each other with rear ends extended on the touch-screen-type operation surface;
the third operation unit and the fourth operation unit are formed to be connected to each other with front ends extended on the touch-screen-type operation surface; and furthermore
a connection part of the first operation unit and the second operation unit and a connection part of the third operation unit and the fourth operation unit are formed to be connected to each other via a convex or concave guide unit formed on the touch-screen-type operation surface.

Supplementary Note 9

The operation device according to any of Supplementary Notes 5 to 8, wherein
the operation device is configured to accept a touch operation for a part other than a part where the operation unit is formed on the touch-screen-type operation surface as an operation instruction different from an operation instruction that can be input into the operation unit.

Supplementary Note 10

The operation device according to Supplementary Note 9, wherein the operation device is configured to accept a touch operation for a part near the part where the operation unit is formed on the touch-screen-type operation surface as an operation instruction that is for the window associated with the operation unit and is different from the operation instruction that can be input into the operation unit.

Supplementary Note 11

The operation device according to Supplementary Note 9 or 10, wherein
the operation device is configured to notify acceptance of the operation instruction by the touch operation for the part other than part where the operation unit is formed on the touch-screen-type operation surface through a notifying unit installed in the vehicle.

Supplementary Note 12

An operation acceptance method by an operation device having a touch-screen-type operation surface installed in a vehicle, the operation acceptance method comprising
accepting a touch operation input into each of a plurality of operation units formed in a convex shape or a concave shape associated with a plurality of components mounted in the vehicle, respectively, as an operation instruction for the component associated with the operation unit, the plurality of operation units being formed at different positions on the touch-screen-type operation surface, respectively.

Supplementary Note 13

The operation acceptance method according to Supplementary Note 12, wherein
at each of positions on the touch-screen-type operation surface corresponding to a relative positional relation of a plurality of windows mounted in the vehicle, the operation unit associated with each of the windows is formed,
the operation acceptance method comprising
accepting a touch operation input into each of the plurality of operation units as an operation instruction for the window associated with the operation unit.

Supplementary Note 14

The operation acceptance method according to Supplementary Note 13, wherein
the operation unit is formed in a linear shape having a predetermined length,
the operation acceptance method comprising
accepting a touch operation input along the linear shape of the operation unit as an operation instruction to open or close the associated window.

Although the present invention has been described above with reference to the example embodiments, the present invention is not limited to the example embodiments. The configurations and details of the present invention can be changed in various manners that can be understood by one skilled in the art within the scope of the present invention.

EXPLANATION OF NUMERALS

10 operation panel
11 driver's seat window operation unit
12 passenger seat window operation unit
13 operation unit for window of rear seat behind driver's seat
14 operation unit for window of rear seat behind passenger seat
15 connection unit
16 door lock operation unit
20 control device
DR driver's seat window
AS passenger seat window
RR window of rear seat behind drivers' seat
RL window of rear seat behind passenger seat
D1 driver's seat door

The invention claimed is:

1. An operation device having a touch-screen-type operation surface installed in a vehicle, wherein:
a plurality of operation units formed in a convex shape or a concave shape associated with a plurality of components mounted in the vehicle, respectively, are formed at different positions on the touch-screen-type operation surface, respectively;
the plurality of operation units are configured to accept an input touch operation as an operation instruction for the component associated with each of the operation units,
at each of positions on the touch-screen-type operation surface corresponding to a relative positional relation of the plurality of components mounted in the vehicle, the operation unit associated with each of the components is formed, and
some or all of the plurality of operation units are formed to have their ends extended and to be directly connected to each other on the touch-screen-type operation surface.

2. An operation device having a touch-screen-type operation surface installed in a vehicle, wherein:
a plurality of operation units formed in a convex shape or a concave shape associated with a plurality of windows mounted in the vehicle, respectively, are formed at different positions on the touch-screen-type operation surface, respectively;
the plurality of operation units are configured to accept an input touch operation as an operation instruction for the windows associated with each of the operation units;
at each of positions on the touch-screen-type operation surface corresponding to a relative positional relation of the plurality of windows mounted in the vehicle, the operation unit associated with each of the windows is formed; and
the plurality of operation units are configured to accept an input touch operation as an operation instruction for the window associated with each of the operation units.

3. The operation device according to claim 2, wherein
the operation unit is formed in a linear shape having a predetermined length and is configured to accept a touch operation input along the linear shape as an operation instruction to open or close the associated window.

4. The operation device according to claim 3, wherein
the operation unit is formed in a linear shape extending substantially toward a front and a rear of the vehicle and is configured to accept a touch operation input substantially toward the front as an operation to close the associated window and accept a touch operation input substantially toward the rear as an operation to open the associated window.

5. The operation device according to claim 3, wherein
the operation unit is configured to accept the touch operation input along the linear shape as a different operation instruction for the associated window in accordance with an operation content of the touch operation.

6. The operation device according to claim 3, wherein the plurality of operation units include:
a first operation unit associated with the window in a right front of the vehicle and formed in a right front of the touch-screen-type operation surface;
a second operation unit associated with the window in a left front of the vehicle and formed in a left front of the touch-screen-type operation surface;
a third operation unit associated with the window in a right rear of the vehicle and formed in a right rear of the touch-screen-type operation surface; and
a fourth operation unit associated with the window in a left rear of the vehicle and formed in a left rear of the touch-screen-type operation surface, and wherein:
the first operation unit and the second operation unit are formed to be connected to each other with rear ends extended on the touch-screen-type operation surface;
the third operation unit and the fourth operation unit are formed to be connected to each other with front ends extended on the touch-screen-type operation surface; and furthermore
a connection part of the first operation unit and the second operation unit and a connection part of the third operation unit and the fourth operation unit are formed to be connected to each other via a convex or concave guide unit formed on the touch-screen-type operation surface.

7. The operation device according to claim 3, wherein the operation device is configured to accept a touch operation for a part other than a part where the operation unit is formed on the touch-screen-type operation surface as an operation instruction different from an operation instruction that can be input into the operation unit.

8. The operation device according to claim 7, wherein the operation device is configured to accept a touch operation for a part near the part where the operation unit is formed on the touch-screen-type operation surface as an operation instruction that is for the window associated with the operation unit and is different from the operation instruction that can be input into the operation unit.

9. The operation device according to claim 7, wherein the operation device is configured to notify acceptance of the operation instruction by the touch operation for the part other than part where the operation unit is formed on the touch-screen-type operation surface through a notifying unit installed in the vehicle.

10. An operation acceptance method by an operation device having a touch-screen-type operation surface installed in a vehicle, the operation acceptance method comprising
accepting a touch operation input into each of a plurality of operation units formed in a convex shape or a concave shape associated with a plurality of windows mounted in the vehicle, respectively, as an operation instruction for the window associated with the operation unit, the plurality of operation units being formed at different positions on the touch-screen-type operation surface, respectively, wherein at each of positions on the touch-screen-type operation surface corresponding to a relative positional relation of the plurality of windows mounted in the vehicle, the operation unit associated with each of the windows is formed; and
accepting a touch operation input into each of the plurality of operation units as an operation instruction for the window associated with the operation unit.

11. The operation acceptance method according to claim 10, wherein the operation unit is formed in a linear shape having a predetermined length,
the operation acceptance method comprising
accepting a touch operation input along the linear shape of the operation unit as an operation instruction to open or close the associated window.

* * * * *